No. 646,552. Patented Apr. 3, 1900.
G. W. GESNER.
STORAGE BATTERY.
(Application filed Dec. 18, 1899.)

(No Model.)

Witnesses:
A. P. Appleman
Patrick Francis

Inventor:
George W Gesner

UNITED STATES PATENT OFFICE.

GEORGE WELTDEN GESNER, OF NEW YORK, N. Y., ASSIGNOR TO HARLESTON CORBETT GESNER, OF SAME PLACE.

STORAGE BATTERY.

SPECIFICATION forming part of Letters Patent No. 646,552, dated April 3, 1900.

Application filed December 18, 1899. Serial No. 740,784. (No model.)

*To all whom it may concern:*

Be it known that I, GEORGE WELTDEN GESNER, a citizen of the United States, and a resident of the borough of Brooklyn, in the city and State of New York, have invented a new and useful manufacture of storage batteries, comprising grids or plates for holding lead oxid or other pastes in place, and cells or boxes and containing vessels for the same, of an alloy of iron and hydrogen, the hydrogen being present in such quantity as to prevent the action of all oxidizing agents, including that arising from chlorin, and being of much less specific gravity than any metal or metallic or other compound now used therefor, of which the following is a specification.

The accompanying drawings illustrate a construction of storage batteries embodying my present invention.

Figure 1:
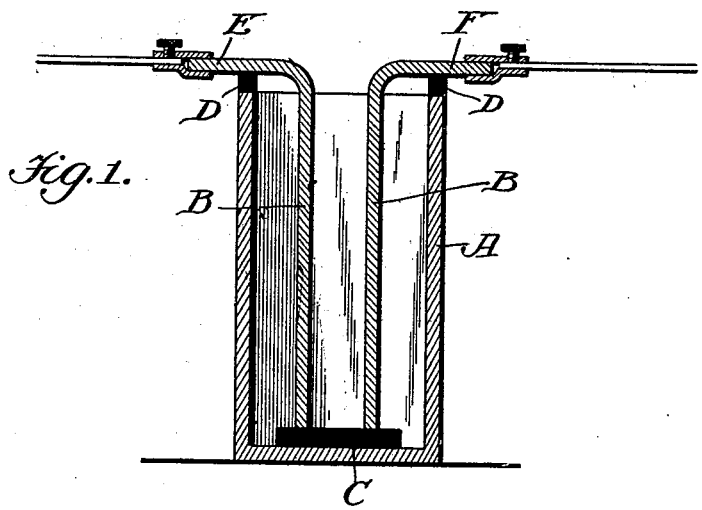
Figure 2:
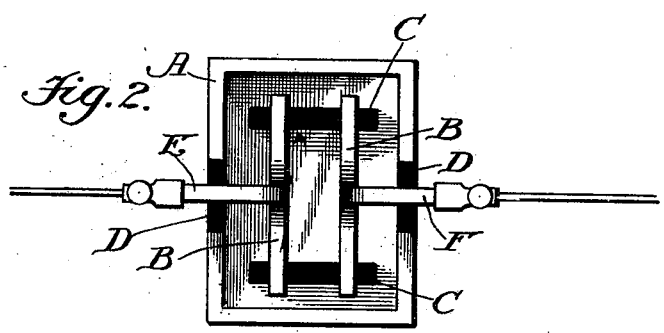
Figure 3:
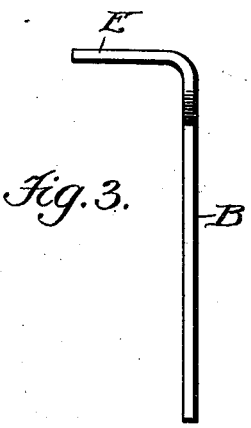
Figure 4:
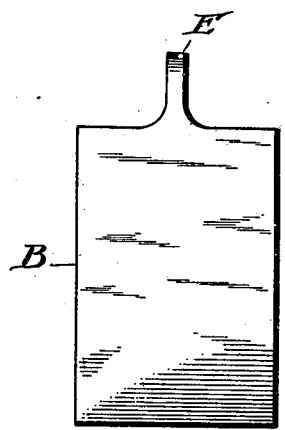

In said drawings, Figure 1 is a vertical sectional elevation through such battery, illustrating one manner of supporting the positive and negative electrodes and the connecting provisions for the terminals. Fig. 2 is a plan view of the battery illustrated in Fig. 1; and Figs. 3 and 4 are a section and plan view, respectively, of one of the electrodes.

In the construction represented the cell A is made of an alloy of iron and hydrogen invented by me. Within this cell are located the plates or frames B B, which have the lead oxid or other paste of active material applied thereto. The frames or plates B B are also made from the improved alloy and are supported within the cell by having their lower ends resting upon blocks C of insulating material, their upper portions E F being oppositely and horizontally bent to bear and be supported on further insulating blocks or sections D, located at the top edge of the cell. The projecting parts of the portions E F are provided with suitable clamping-sleeves to facilitate circuit connections. A secondary battery having its cell and electrodes made from the alloy will be extremely light, thus to a great extent avoiding the serious objections of great weight incident to existing types.

The manufacture is based upon an application for United States patent by me filed March 10, 1896, Serial No. 582,600, and upon subsequent applications allowed and pending. These applications describe the apparatus, process, and product claimed and relate to the commercial manner of making and manipulating the alloy of iron and hydrogen and mention its valuable qualities, which consist chiefly in its resistance to oxidation and corrosion from heat or chemical action arising from either atmospheric or more powerful influences. By the term "oxidation" I include the oxidizing action of chlorin on metals and metallic compounds.

One of the electrolytes used in a secondary battery in which the alloy is employed may be dilute sulfuric acid.

I claim as my invention—

1. A storage battery having a part or portion subject to oxidation or corrosion, made from an alloy of iron and hydrogen, the latter being present in such proportions as to prevent such oxidation or corrosion of the iron in said alloy.

2. A storage-battery grid or plate made from an alloy of iron and hydrogen, the latter being present in such proportions as to prevent oxidation or corrosion of the iron in said alloy.

3. The combination in a storage battery, of a cell having its inner face of an alloy of iron and hydrogen, and a grid or plate made from the same alloy, the proportion of hydrogen in both cell and grid or plate being present in such proportion as to prevent the oxidation or corrosion of the iron in said alloy.

4. A storage battery comprising a grid or plate for holding lead oxid or other paste in place and a cell or containing vessel for the same both of an alloy of iron and hydrogen, the hydrogen being present in the proportion of about eleven one-hundredths of one per cent. and upward in the alloy.

In testimony that I claim the invention as above set forth I affix my signature in the presence of two witnesses.

GEORGE WELTDEN GESNER.

Witnesses:
EDWARD P. SCHWARTZ,
BERTHA L. DANA.